United States Patent
Tosaji et al.

(10) Patent No.: US 9,746,036 B2
(45) Date of Patent: Aug. 29, 2017

(54) WELDING METHOD FOR OUTER JOINT MEMBER OF CONSTANT VELOCITY UNIVERSAL JOINT, AND OUTER JOINT MEMBER

(71) Applicants: Masahiro Tosaji, Shizuoka (JP); Naoki Nakagawa, Shizuoka (JP)

(72) Inventors: Masahiro Tosaji, Shizuoka (JP); Naoki Nakagawa, Shizuoka (JP)

(73) Assignee: NTN CORPORATION, Osaka (JP)

( * ) Notice: Subject to any disclaimer, the term of this patent is extended or adjusted under 35 U.S.C. 154(b) by 409 days.

(21) Appl. No.: 14/355,623

(22) PCT Filed: Oct. 19, 2012

(86) PCT No.: PCT/JP2012/077055
§ 371 (c)(1),
(2) Date: May 1, 2014

(87) PCT Pub. No.: WO2013/069433
PCT Pub. Date: May 16, 2013

(65) Prior Publication Data
US 2014/0291301 A1    Oct. 2, 2014

(30) Foreign Application Priority Data
Nov. 8, 2011 (JP) .................. 2011-244508

(51) Int. Cl.
*F16D 3/20* (2006.01)
*F16C 3/02* (2006.01)
(Continued)

(52) U.S. Cl.
CPC ............ *F16D 3/20* (2013.01); *B23K 15/0006* (2013.01); *B23K 15/0033* (2013.01);
(Continued)

(58) Field of Classification Search
CPC ............ F16D 3/20; F16D 1/027; F16D 1/068; F16D 3/2055; F16D 3/223;
(Continued)

(56) References Cited

U.S. PATENT DOCUMENTS

| 4,208,003 A | 6/1980 | Meylan |
| 4,610,643 A * | 9/1986 | Krude .................. F16D 3/2233 464/143 |

(Continued)

FOREIGN PATENT DOCUMENTS

| CH | 621 962 | 3/1981 |
| CN | 101947721 | 1/2011 |

(Continued)

OTHER PUBLICATIONS

Chinese Office Action issued Dec. 28, 2015 in corresponding Chinese Patent Application No. 201280054864.0 (Partial English-language translation).

(Continued)

*Primary Examiner* — Arthur O Hall
*Assistant Examiner* — Adam J Rogers
(74) *Attorney, Agent, or Firm* — Wenderoth, Lind & Ponack, L.L.P.

(57) ABSTRACT

A welding method for an outer joint member of a constant velocity universal joint includes constructing a cup section having track grooves, which engage with torque transmitting elements, formed along an inner periphery thereof and a shaft section that is formed on a bottom portion of the cup section by two or more separate members, joining a cup member forming the cup section and a shaft member forming the shaft section, and melt-welding end portions of the cup member and the shaft member. The cup member and the shaft member are shaped so that a sealed hollow cavity portion is formed when the end portions of the cup member (Continued)

and the shaft member are brought into abutment against each other, the melt-welding of the end portions being performed when the sealed hollow cavity portion is under atmospheric pressure or lower.

17 Claims, 12 Drawing Sheets

(51) Int. Cl.
| | |
|---|---|
| B23K 15/00 | (2006.01) |
| B23K 26/08 | (2014.01) |
| F16D 1/027 | (2006.01) |
| F16D 1/068 | (2006.01) |
| F16D 3/205 | (2006.01) |
| F16D 3/223 | (2011.01) |
| B23K 26/282 | (2014.01) |
| B23K 26/60 | (2014.01) |
| B23K 101/00 | (2006.01) |
| B23K 101/06 | (2006.01) |

(52) U.S. Cl.
CPC ...... *B23K 15/0046* (2013.01); *B23K 26/0823* (2013.01); *B23K 26/282* (2015.10); *B23K 26/60* (2015.10); *F16C 3/023* (2013.01); *F16D 1/027* (2013.01); *F16D 1/068* (2013.01); *F16D 3/2055* (2013.01); *F16D 3/223* (2013.01); *B23K 2201/006* (2013.01); *B23K 2201/06* (2013.01); *F16D 2003/22326* (2013.01)

(58) Field of Classification Search
CPC .. F16D 2003/22326; B60G 2206/8201; B60G 2202/143; B60G 2206/80; B23K 2203/04; B23K 26/21; B23K 31/02; B23K 35/32; B23K 37/00; B23K 9/00; B23K 9/0216; B23K 9/025; B23K 9/0288; B23K 9/16; B23K 9/173; B23K 26/282; B23K 26/60; B23K 15/0006; B23K 15/0033; B23K 15/0046; B23K 26/0823; B23K 2201/006; B23K 2201/06; F16C 3/023
USPC .................................................. 219/121.64
See application file for complete search history.

(56) References Cited

U.S. PATENT DOCUMENTS

| | | | | |
|---|---|---|---|---|
| 6,435,531 | B1* | 8/2002 | Acker | B60G 11/20 280/124.107 |
| 7,040,992 | B2* | 5/2006 | Dine | F16D 3/2237 464/145 |
| 7,204,494 | B2* | 4/2007 | Reichel | B60G 21/0553 280/124.107 |
| 7,708,645 | B2* | 5/2010 | Miller | F16J 3/047 464/173 |
| 7,871,092 | B2* | 1/2011 | Renard | B60B 35/04 280/124.107 |
| 7,967,308 | B2* | 6/2011 | Toepker | B21D 53/88 280/124.106 |
| 8,696,472 | B2* | 4/2014 | Ebert | F16D 3/223 464/15 |
| 2002/0163181 | A1* | 11/2002 | Russell | F16L 15/08 285/41 |
| 2005/0137022 | A1* | 6/2005 | Neeley | F16D 3/2055 464/111 |
| 2007/0199763 | A1* | 8/2007 | Henze | B60B 35/006 180/378 |
| 2009/0008211 | A1 | 1/2009 | Yammoto | |
| 2010/0119300 | A1* | 5/2010 | Nakagawa | F16D 1/068 403/271 |
| 2011/0269555 | A1 | 11/2011 | Morimoto et al. | |
| 2016/0201730 | A1* | 7/2016 | Osugi | F16D 3/20 464/106 |

FOREIGN PATENT DOCUMENTS

| | | |
|---|---|---|
| JP | 63-210407 | 9/1988 |
| JP | 63-260685 | 10/1988 |
| JP | 8-252681 | 10/1996 |
| JP | 2002-35956 | 2/2002 |
| JP | 2006-64060 | 3/2006 |
| JP | 2008-95805 | 4/2008 |
| JP | 2009-121502 | 6/2009 |
| JP | 2010-164181 | 7/2010 |
| JP | 2011-117509 | 6/2011 |
| WO | 2007/097043 | 8/2007 |
| WO | 2011/062040 | 5/2011 |

OTHER PUBLICATIONS

Extended European Search Report issued Mar. 3, 2016 in corresponding European Patent Application No. 12848557.0.
International Preliminary Report on Patentability and Written Opinion of the International Searching Authority issued May 22, 2014 in International (PCT) Application No. PCT/JP2012/077055.
International Search Report issued Nov. 13, 2012 in International (PCT) Application No. PCT/JP2012/077055.

* cited by examiner

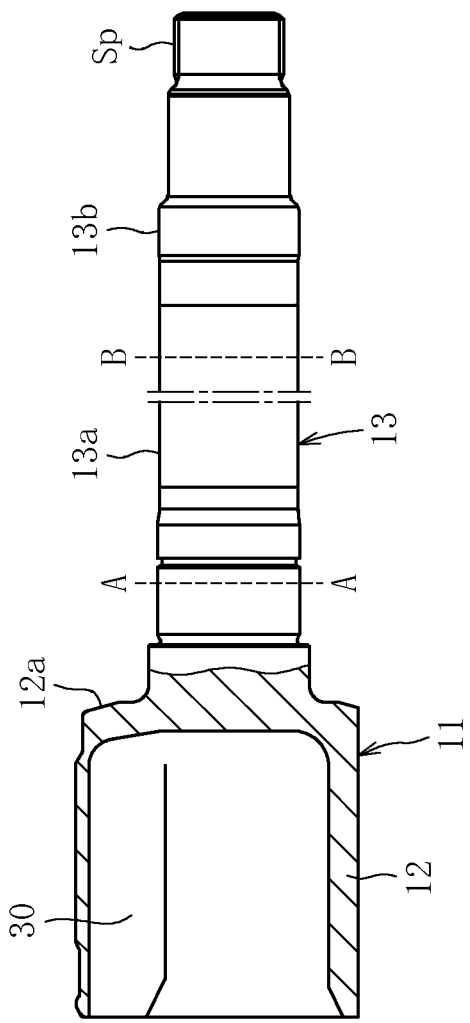
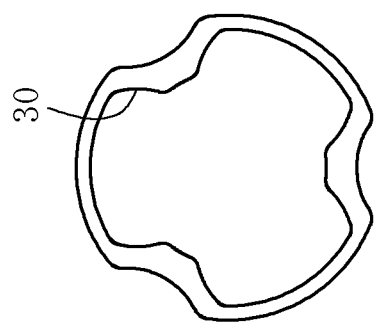

US 9,746,036 B2

WELDING METHOD FOR OUTER JOINT MEMBER OF CONSTANT VELOCITY UNIVERSAL JOINT, AND OUTER JOINT MEMBER

TECHNICAL FIELD

The present invention relates to a welding method for an outer joint member of a constant velocity universal joint, and to an outer joint member.

BACKGROUND ART

In a constant velocity universal joint, which is used to construct a power transmission system for automobiles and various industrial machines, two shafts on a driving side and a driven side are coupled to each other to allow torque transmission therebetween, and rotational torque is transmitted at a constant velocity even when each of the two shafts forms an operating angle. The constant velocity universal joint is roughly classified into a fixed type constant velocity universal joint that allows only angular displacement, and a plunging type constant velocity universal joint that allows both the angular displacement and axial displacement. In a drive shaft for transmitting power from an engine of an automobile to a driving wheel, for example, the plunging type constant velocity universal joint is used on a differential side (inboard side), and the fixed type constant velocity universal joint is used on a driving wheel side (outboard side).

Irrespective of the plunging type and the fixed type, the constant velocity universal joint includes, as a main component, an outer joint member including a cup section having track grooves formed in an inner peripheral surface thereof to engage with torque transmitting elements, and a shaft section that extends from a bottom portion of the cup section in an axial direction. In many cases, the outer joint member is obtained by integrally forming the cup section and the shaft section by subjecting a rod-like solid material to a cold deformation process such as a forging process and an ironing process or a machining process such as a cutting process and a grinding process.

By the way, as the outer joint member, a shaft section that is long (long stem) may sometimes be used. In order to equalize lengths of a right part and a left part of the drive shaft, the long stem is used for an outer joint member on the inboard side that corresponds to one side of the drive shaft. The long stem is rotatably supported by a rolling bearing. Although varied depending on vehicle types, the length of the long stem section is substantially about 300 mm to 400 mm. In the outer joint member, the shaft section is long, which causes difficulty in integrally forming the cup section and the shaft section with high accuracy. Therefore, there is known an outer joint member in which a cup member forming the cup section and a shaft member forming the shaft section are constructed as separate members, and both the members are joined through friction press-contact. The joint member obtained by joining through the friction press-contact is disclosed in, for example, JP 2006-64060 A.

The outer joint member of the constant velocity universal joint illustrated in FIG. 5 of JP 2006-64060 A is described with reference to FIGS. 11 and 12. An intermediate product 51' of an outer joint member 51 includes a component 52 serving as a cup member, a component 53 serving as a pipe member, and a component 54 serving as a stub member, and the components are joined through the friction press-contact. As illustrated in FIG. 11, burrs are generated at inner and outer diameters on joining portions 55 and 56 through the press-contact. In order to mount the rolling bearing (see FIG. 1) to a shaft section of the intermediate product 51' of the outer joint member 51, it is necessary to remove burrs 55a and 56a on the outer diameter side of the joining portions 55 and 56 through a process such as lathing. Although not shown, the intermediate product 51' is processed into a finished product of the outer joint member 51 through a machining process of a spline, stopper ring grooves, and the like. Therefore, the outer joint member 51 and the intermediate product 51' have slight differences in shape, but illustration of the slight differences in shape is herein omitted to simplify the description, and the outer joint member 51 as the finished product and the intermediate product 51' are denoted by the same reference symbols at the same parts. The same applies to the description below.

PROBLEMS TO BE SOLVED BY THE INVENTION

The burrs 55a and 56a on the joining portions 55 and 56 generated through the friction press-contact described above are quenched by friction heat. Thus, the burrs 55a and 56a have a high hardness and a distorted shape extended in a radial direction and an axial direction. Therefore, as illustrated in FIG. 12, when removing the burrs 55a and 56a on the outer diameter side through the lathing process, a lathe tip is liable to be significantly abraded due to the high hardness and cracked due to the distorted shape. Therefore, it is difficult to increase lathing speed. In addition, a cutting amount per one pass of the lathe tip is decreased, and hence the number of passes is increased, which causes a problem in that a cycle time is increased to increase a manufacturing cost.

Further, in order to inspect a joining state of the joining portions 55 and 56 of the outer joint member 51, when ultrasonic flaw detection, which enables flaw detection at high speed, is to be performed, an ultrasonic wave is scattered due to the burrs 55a and 56a remaining on the inner diameter side of the joining portions 55 and 56, and hence the joining state cannot be confirmed. Therefore, there occurs a problem in that total inspection through the ultrasonic flaw detection cannot be performed.

In view of the above-mentioned problems, when the components are joined through laser welding or electron beam welding, it is possible to prevent surfaces of the joining portions from being increased in thickness unlike the case of the friction press-contact. However, the outer joint member illustrated in FIG. 13 has a shape in which the component 52 serving as the cup member has a solid shape, the component 53 serving as the pipe member has a hollow shape, and the component 54 serving as the stub member has a solid shape. Therefore, when those components are brought into abutment against each other to be welded, gas pressure in a hollow cavity portion 53a of the pipe member is increased due to processing heat at the time of the welding, and after completion of the welding, the pressure is decreased. Due to the variation in the internal pressure of the hollow cavity portion 53a, blowing of a molten material and deformation on the inner diameter side occur. Thus, unevenness is formed on inner and outer diameter surfaces of welding portions, poor welding in terms of depth occurs, and air bubbles are generated inside the welding portions, thereby degrading the welding state. As a result, the strength of the welding portions is not stable, which adversely affects quality. As a countermeasure, it is conceived to provide a ventilation hole that communicates with the hollow cavity portion 53a. However, a step of providing the ventilation hole is added, and hence there is a fear of increasing the manufacturing cost and influence on the strength of a product depending on a hole diameter and a portion at which the ventilation hole is provided.

SUMMARY OF THE INVENTION

The present invention has been proposed in view of the above-mentioned problems, and it is therefore an object thereof to provide a welding method for an outer joint member suitable for a long stem type constant velocity universal joint, and to provide an outer joint member. The welding method for an outer joint member and the outer joint member are capable of enhancing quality of welding portions, reducing a manufacturing cost through omission or reduction of the number of additional steps or post processes, and securing stable quality through reliable inspection on the welding portions.

SOLUTIONS TO THE PROBLEMS

Through various studies for achieving the above-mentioned object, the inventors of the present invention have conceived the novel idea, that is, employing melt-welding capable of preventing surfaces of joining portions from increasing in thickness, and welding a hollow cavity portion in a state under atmospheric pressure or lower, the hollow cavity portion being formed when both end portions of a cup member and a shaft member are brought into abutment against each other.

As a technical measure to achieve the above-mentioned object, according to one embodiment of the present invention, there is provided a welding method for an outer joint member of a constant velocity universal joint, the welding method comprising: constructing a cup section having track grooves, which engage with torque transmitting elements, formed along an inner periphery thereof and a shaft section that is formed on a bottom portion of the cup section by two or more separate members; joining a cup member forming the cup section and a shaft member forming the shaft section; and melt-welding end portions of the cup member and the shaft member, the cup member and the shaft member being brought into abutment against each other at the end portions thereof, the cup member and the shaft member being shaped so that a sealed hollow cavity portion is formed when the end portions of the cup member and the shaft member are brought into abutment against each other, the melt-welding the end portions being performed in a state in which the sealed hollow cavity portion is under atmospheric pressure or lower. With this configuration, it is possible to realize enhancement of quality of welding portions, reduction of a manufacturing cost through the omission or the reduction of the number of additional steps or the post processes, and stable quality through reliable inspection on the welding portions.

Specifically, as one method, the state in which the sealed hollow cavity portion is under the atmospheric pressure or lower can be realized by entirely housing the cup member and the shaft member in a sealed space, and decompressing the sealed space to the atmospheric pressure or lower. In this case, the structure of the sealed space that is decompressed to the atmospheric pressure or lower can be simplified. Further, as another method, the state in which the sealed hollow cavity portion is under the atmospheric pressure or lower can be realized by housing only vicinities of the end portions of the cup member and the shaft member in a sealed space, and decompressing the sealed space to the atmospheric pressure or lower. In this case, a capacity of the sealed space can be reduced. Thus, a pump capacity of a vacuum pump can be reduced, and hence a welding apparatus can be downsized and the decompressing load can be reduced.

When the sealed space is decompressed to the atmospheric pressure or lower, it is desired that a gap be secured between the end portions of the cup member and the shaft member. With this, the sealed hollow cavity portion formed of the cup member and the shaft member can be reliably decompressed. Further, the configuration is suitable for automating a series of steps of carrying-in and installation, decompressing, and welding of the cup member and the shaft member serving as workpieces.

It is desired that the melt-welding comprise laser welding or electron beam welding. With this, burrs are not generated on the joining portions. Reduction of a manufacturing cost through the omission or the reduction of the number of the post processes of the joining portions can be reliably realized, and further, total inspection on the joining portions through ultrasonic flaw detection can be reliably performed.

Before the melt-welding, it is desired to preheat the end portions of the cup member and the shaft member to 300° C. to 650° C. With this, cooling speed after the welding can be lowered to prevent quenching crack, and a hardness of the portions at which the melt-welding is performed is adjusted, thereby obtaining a satisfactory welding state.

It is preferred that a hardness of the portions, at which the melt-welding is performed, be in a range of Hv 200 to Hv 500. It is not desired that the hardness be less than Hv 200 because it is difficult to ensure the strength necessary in terms of a product function. On the other hand, it is not desired that the hardness exceed Hv 500 because there is a fear of generation of cracks.

According to the outer joint member according to one embodiment of the present invention, it is possible to realize the enhancement of the quality of the welding portions, the reduction of the manufacturing cost through the omission or the reduction of the number of the additional steps or the post processes, and the stable quality through the reliable inspection on the welding portions, and hence the outer joint member according to one embodiment of the present invention is suitable for an outer joint member comprising a long stem section.

ADVANTAGEOUS EFFECTS OF INVENTION

According to the welding method for an outer joint member of a constant velocity universal joint and the outer joint member according to embodiments of the present invention, it is possible to realize the enhancement of the quality of the welding portions, the reduction of the manufacturing cost through the omission or the post processes or the reduction of the number of the additional steps or the post processes, and the stable quality through the reliable inspection on the welding portions. Further, the outer joint member according to one embodiment of the present invention is suitable for an outer joint member comprising a long stem section.

BRIEF DESCRIPTION OF DRAWINGS

FIG. 2a is an enlarged partial vertical sectional view of the outer joint member.

FIG. 2b is a horizontal sectional view of a cup section of the outer joint member.

EMBODIMENTS OF THE INVENTION

Now, description is made of embodiments of the present invention with reference to the drawings.

Figure 1:
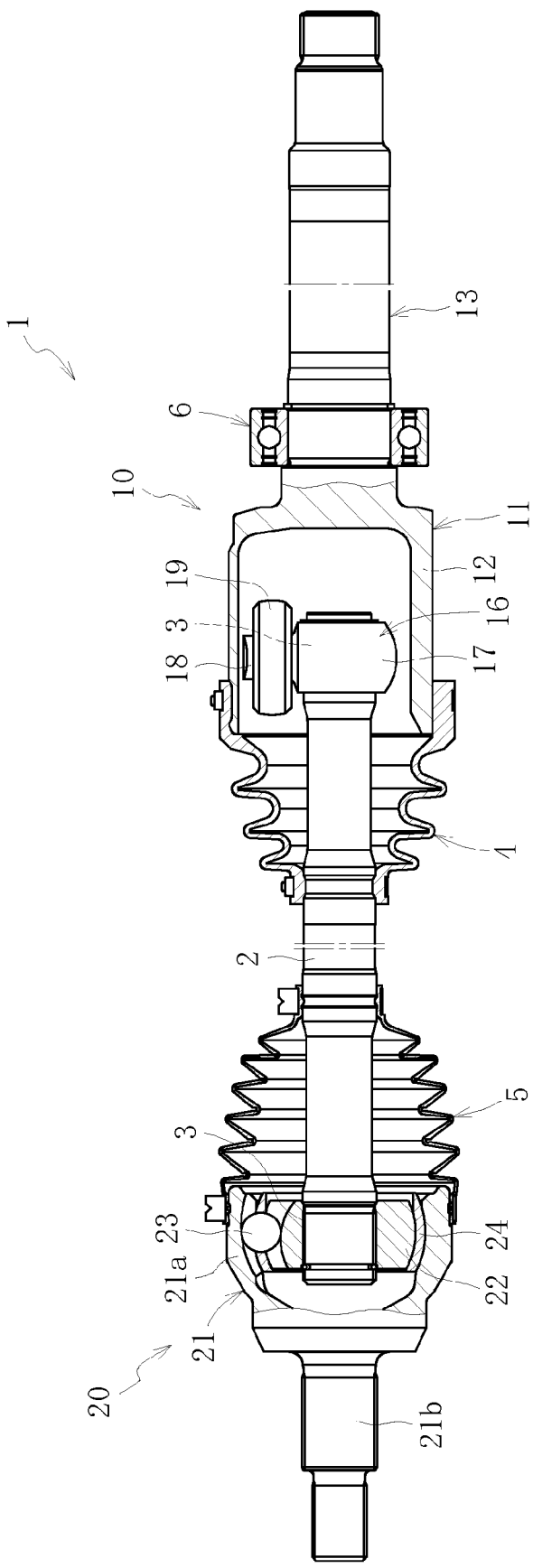
FIG. 1 is a view illustrating the entire structure of a drive shaft to which a first embodiment of an outer joint member according to the present invention is applied.
Figure 3:
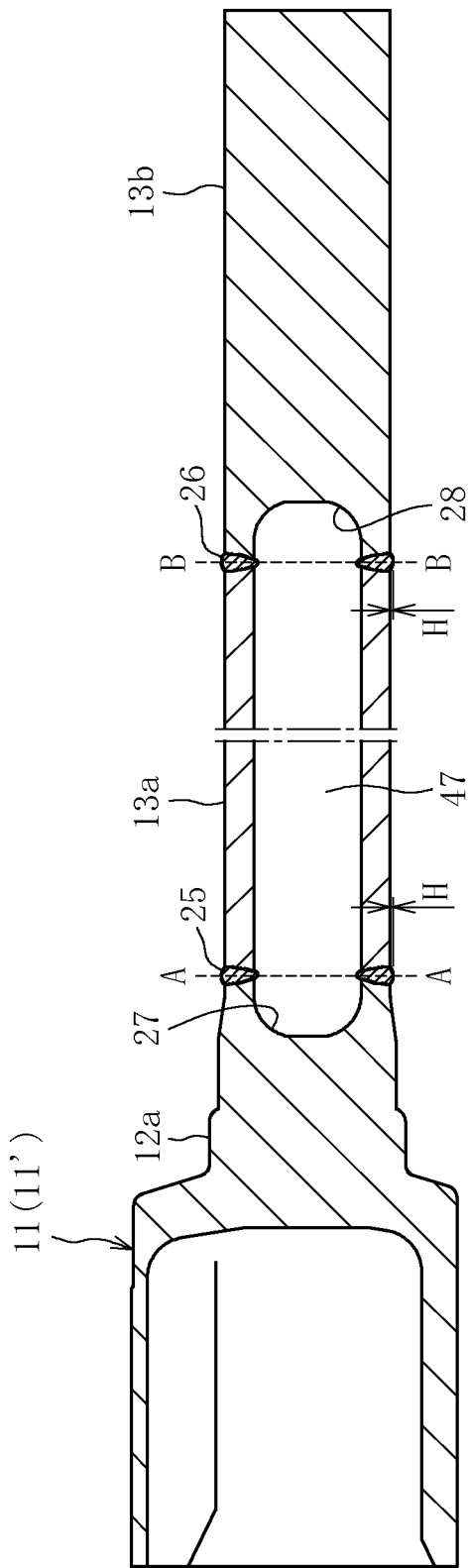
FIG. 3 is a vertical sectional view of a welded outer joint member.
Figure 4:
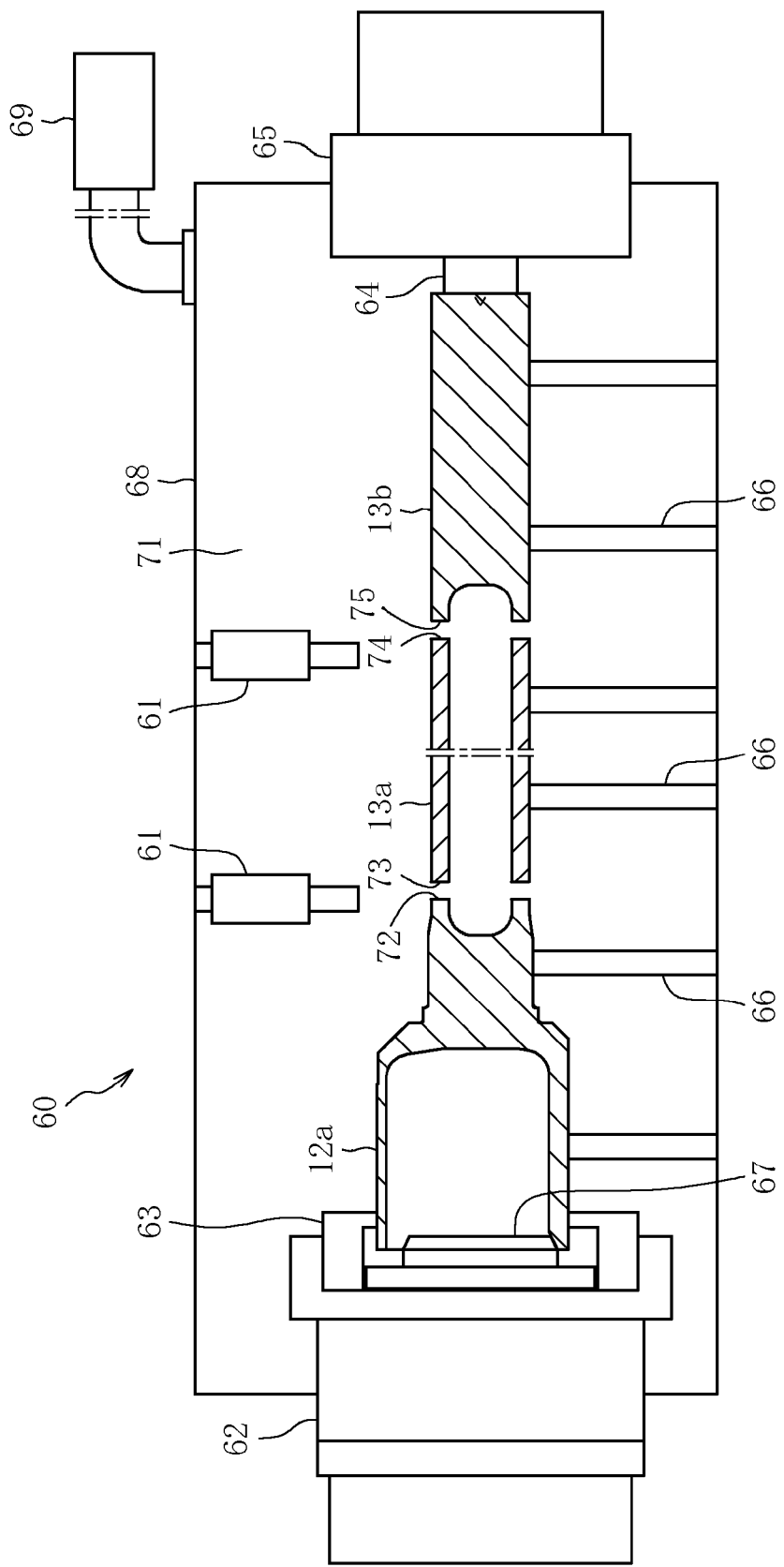
FIG. 4 is a schematic view illustrating a welding apparatus for carrying out a first embodiment of a welding method according to the present invention.
Figure 5:
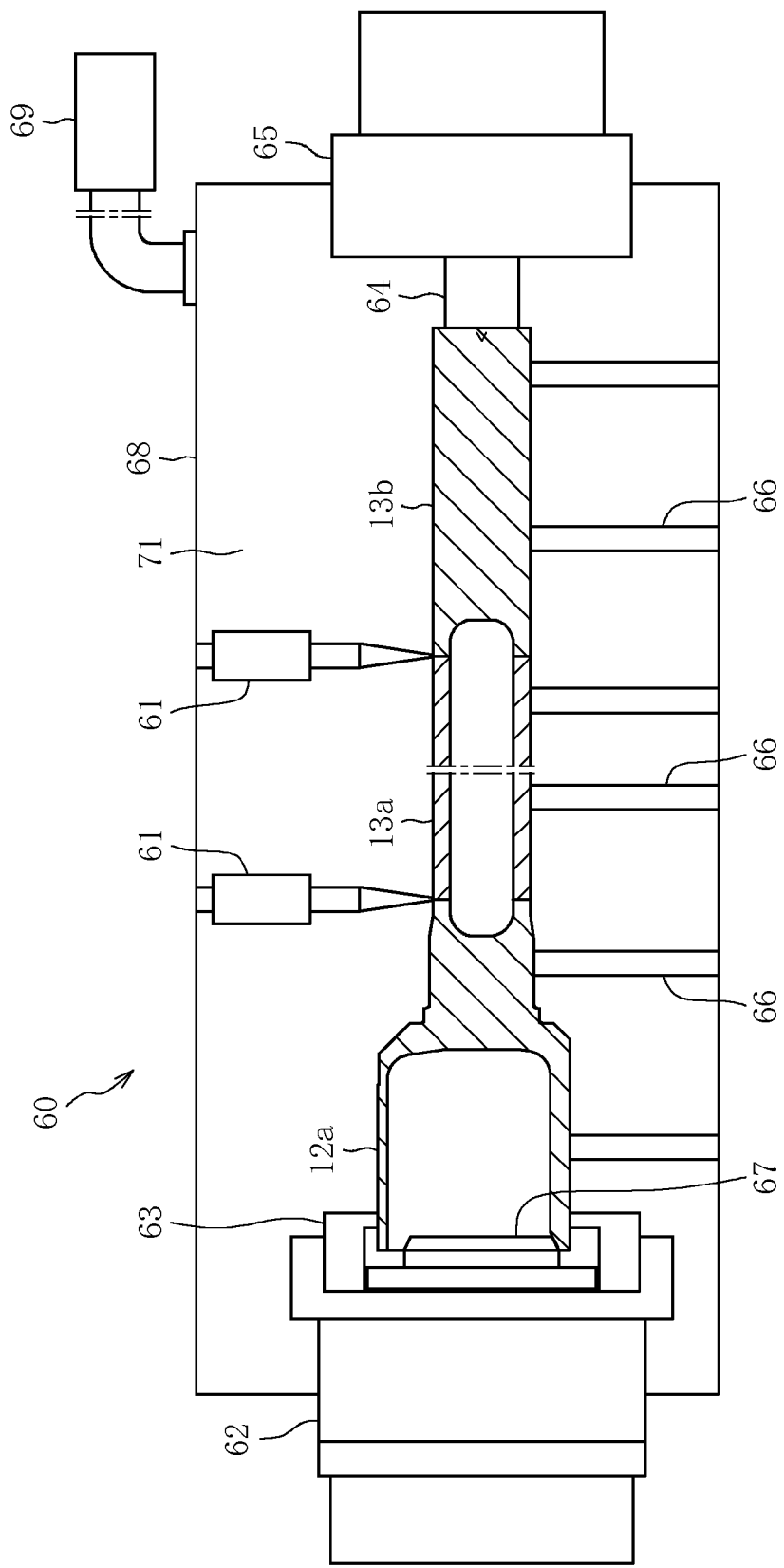
FIG. 5 is a schematic view illustrating the welding apparatus for carrying out the first embodiment of the welding method according to the present invention.

FIGS. 4 and 5 illustrate a first embodiment of a welding method for an outer joint member of a constant velocity universal joint according to the present invention, and FIGS. 1 to 3 illustrate a first embodiment of an outer joint member according to the present invention. First, the first embodiment of the outer joint member is described with reference to FIGS. 1 to 3, and subsequently, the first embodiment of the welding method for an outer joint member is described with reference to FIGS. 4 and 5.

FIG. 1 is a view illustrating the entire structure of a drive shaft 1 using an outer joint member 11 according to the first embodiment. The drive shaft 1 comprises, as main components, a plunging type constant velocity universal joint 10 arranged on a differential side (right side of FIG. 1: hereinafter also referred to as inboard side), a fixed type constant velocity universal joint 20 arranged on a driving wheel side (left side of FIG. 1: hereinafter also referred to as outboard side), and an intermediate shaft 2 that couples both the constant velocity universal joints 10 and 20 to allow torque transmission therebetween.

The plunging type constant velocity universal joint 10 illustrated in FIG. 1 is a so-called tripod type constant velocity universal joint (TJ), and comprises the outer joint member 11 comprising a cup section 12 and a long shaft section (long stem section) 13 that extends from a bottom portion of the cup section 12 in an axial direction, an inner joint member 16 housed along an inner periphery of the cup section 12 of the outer joint member 11, and rollers 19 serving as torque transmitting elements that are arranged between the outer joint member 11 and the inner joint member 16. The inner joint member 16 comprises a tripod member 17 comprising three equiangularly-formed leg shafts 18 on which the rollers 19 are externally fitted in a freely rotatable manner.

An inner race of a support bearing 6 is fixed to an outer peripheral surface of the long stem section 13, and an outer race of the support bearing 6 is fixed to a transmission case with a bracket (not shown). The outer joint member 11 is supported by the support bearing 6 in a freely rotatable manner, and when the support bearing 6 as described above is provided, vibration of the outer joint member 11 at the time of driving or the like is prevented as much as possible.

The fixed type constant velocity universal joint 20 illustrated in FIG. 1 is a so-called Rzeppa type constant velocity universal joint, and comprises an outer joint member 21 comprising a bottomed cylindrical cup section 21a and a shaft section 21b that extends from a bottom portion of the cup section 21a in the axial direction, an inner joint member 22 housed along an inner periphery of the cup section 21a of the outer joint member 21, balls 23 serving as torque transmitting elements that are arranged between the cup section 21a of the outer joint member 21 and the inner joint member 22, and a cage 24 arranged between an inner peripheral surface of the cup section 21a of the outer joint member 21 and an outer peripheral surface of the inner joint member 22, for holding the balls 23 equiangularly. Note that, as the fixed type constant velocity universal joint 20, an undercut free type constant velocity universal joint may sometimes be used.

The intermediate shaft 2 comprises splines for transmitting torque (including serrations; the same applies hereinafter) 3 at outer surfaces on both end portions thereof. The spline 3 on the inboard side is spline-fitted to a hole portion of the tripod member 17 of the plunging type constant velocity universal joint 10. Thus, the intermediate shaft 2 and the tripod member 17 of the plunging type constant velocity universal joint 10 are coupled to each other to allow torque transmission therebetween. Further, the spline 3 on the outboard side is spline-fitted to a hole portion of the inner joint member 22 of the fixed type constant velocity universal joint 20. Thus, the intermediate shaft 2 and the inner joint member 22 of the fixed type constant velocity universal joint 20 are coupled to each other to allow torque transmission therebetween. Although the solid intermediate shaft 2 is illustrated, a hollow intermediate shaft may be used instead.

Grease is sealed inside both the constant velocity universal joints 10 and 20 as a lubricant. To prevent leakage of the grease to an outside of the joint or entrance of a foreign matter from the outside, bellows boots 4 and 5 are respectively mounted to a portion between the outer joint member 11 of the plunging type constant velocity universal joint 10 and the intermediate shaft 2 and a portion between the outer joint member 21 of the fixed type constant velocity universal joint 20 and the intermediate shaft 2.

The outer joint member according to the first embodiment is described with reference to FIGS. 2. FIGS. 2 are enlarged views of the outer joint member 11 of this embodiment, in which FIG. 2a is a partial vertical sectional view, and FIG. 2b is a horizontal sectional view of the cup section. The outer joint member 11 comprises the bottomed cylindrical cup section 12 that is opened at one end and has track grooves 30, on which the rollers 19 (see FIG. 1) roll, formed at three equiangular positions of an inner peripheral surface thereof, and the long stem section 13 that extends from the bottom portion of the cup section 12 in the axial direction and comprises a spline Sp serving as a torque transmitting coupling portion formed at an outer diameter on an end portion thereof on the side opposite to the cup section 12

(inboard side). In this embodiment, the outer joint member 11 is obtained by joining three components, specifically, a component 12a serving as a cup member, a component 13a serving as a pipe member, and a component 13b serving as a stub member. The component 12a serving as the cup member and the component 13a serving as the pipe member are joined at the position indicated by the broken line A, and the component 13a serving as the pipe member and the component 13b serving as the stub member are joined at the position indicated by the broken line B. In this case, the component 13a serving as the pipe member and the component 13b serving as the stub member, are used to construct a shaft member. The component 12a serving as the cup member, the component 13a serving as the pipe member, and the component 13b serving as the stub member are briefly referred to as the cup component 12a, the pipe component 13a, and the stub component 13b, respectively, in the description below.

Figure 11:
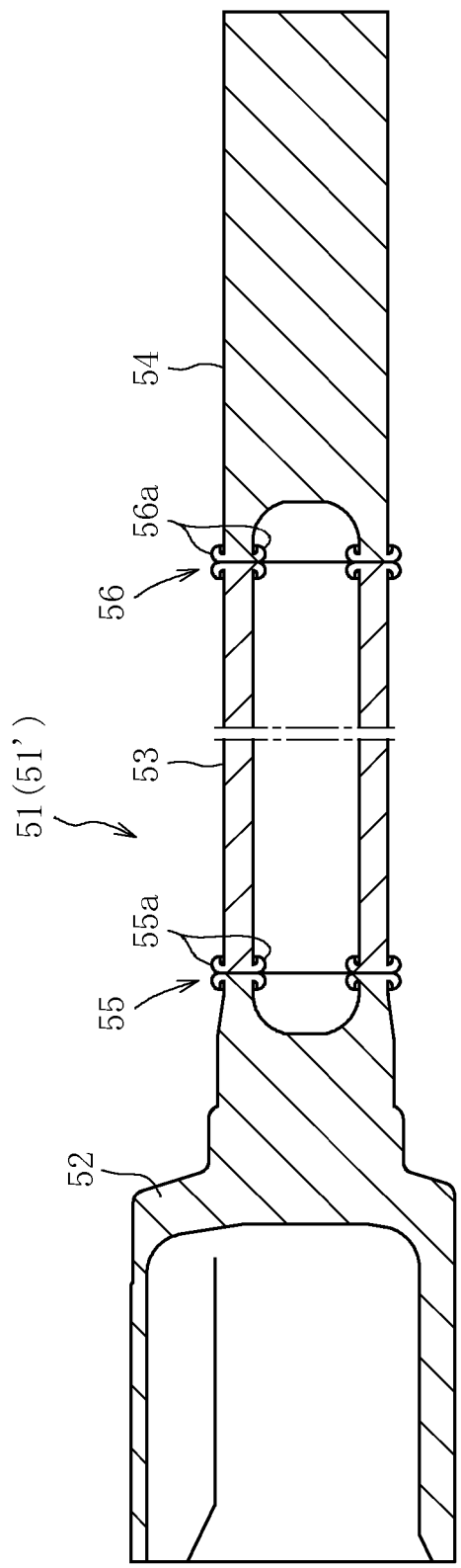
FIG. 11 is a vertical sectional view of an outer joint member according to a related art.
Figure 12:
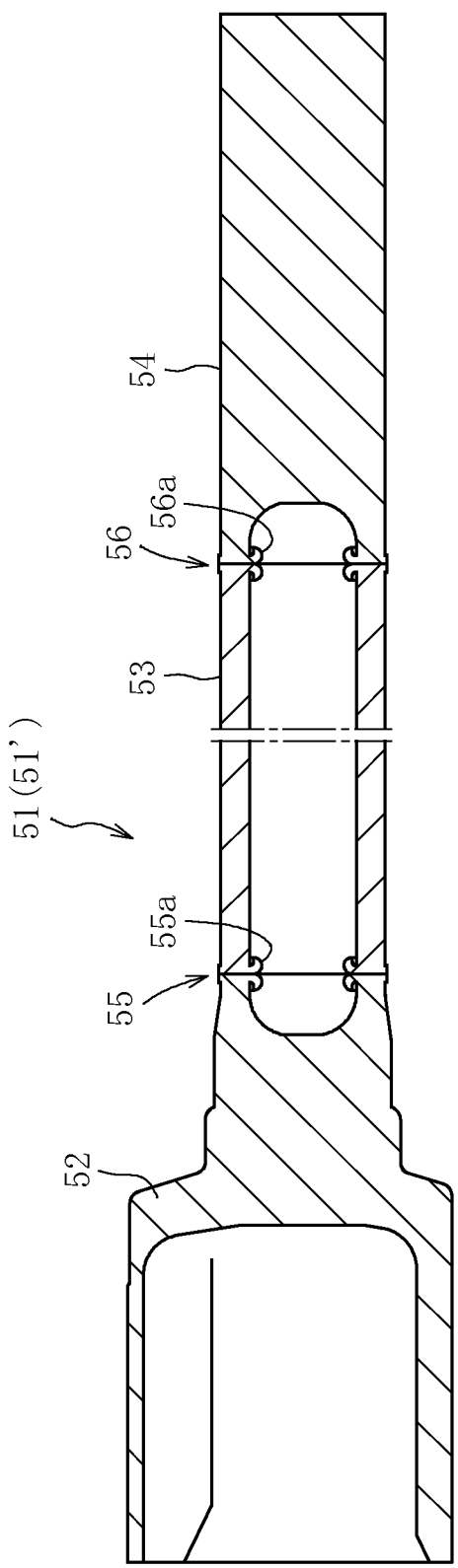
FIG. 12 is a vertical sectional view of the outer joint member according to the related art.
Figure 13:
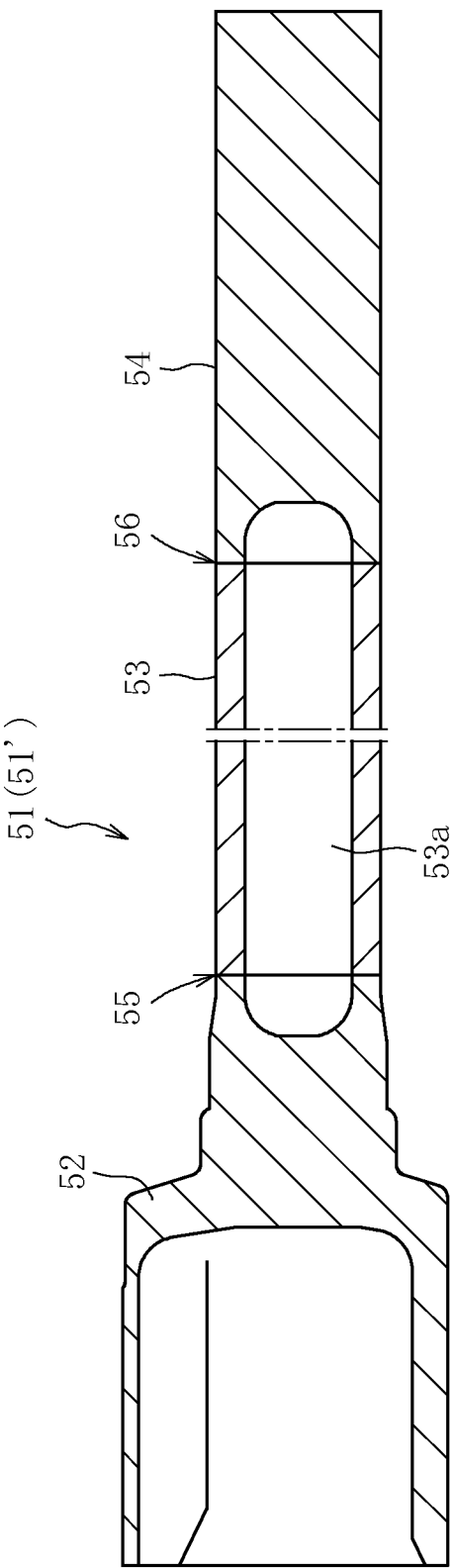
FIG. 13 is a vertical sectional view of an outer joint member according to a related art.

FIG. 3 is a vertical sectional view illustrating an intermediate product 11' of the outer joint member 11 in a welded state. Although not shown, the intermediate product 11' is processed into a finished product of the outer joint member 11 through a machining process of the spline, the stopper ring grooves, and the like. Therefore, the outer joint member 11 and the intermediate product 11' have slight differences in shape, but illustration of the slight differences in shape is herein omitted to simplify the description, and the outer joint member 11 as the finished product and the intermediate product 11' are denoted by the same reference symbols at the same parts. The same applies to the description below. As described above, the intermediate product 11' of the outer joint member 11 is obtained by joining the three components, specifically, the cup component 12a, the pipe component 13a, and the stub component 13b at the positions indicated by the broken line A and the broken line B. As in the example of the figure, depressed portions 27 and 28 are formed at abutment end portions of the cup component 12a and the stub component 13b, respectively. The depressed portions 27 and 28 have approximately the same diameter as an inner diameter of the pipe component 13a. In this case, a space formed by the inner diameter of the pipe component 13a and the depressed portions 27 and 28 is referred to as a sealed hollow cavity portion 47. Among other types of melt-welding, it is preferred that laser welding or electron beam welding be applied as this joining. In this embodiment to which the laser welding is applied, the components can be joined without applying pressure in the axial direction, and hence surfaces of joining portions 25 and 26 can be prevented from being increased in thickness unlike the case of friction press-contact (see FIG. 11). As a result, in a lathing step for outer diameter surfaces of the joining portions 25 and 26, which is necessary to mount the support bearing to a shaft section of the intermediate product 11', the number of processes can be reduced or the lathing step itself can be omitted, thereby achieving reduction of a manufacturing cost.

In this embodiment, although the joining portions 25 and 26 are welded as the structure not having a ventilation hole to the hollow cavity portion 47, through a welding method to be described below, variation in internal pressure of the hollow cavity portion 47 can be suppressed, and hence blowing of a molten material, deformation on an inner diameter side, and welding failure can be prevented, thereby obtaining a satisfactory welding state. In addition, the surfaces of the joining portions can be prevented from being increased in thickness, and total inspection on the joining portions through ultrasonic flaw detection can be reliably performed, thereby realizing stable quality.

Next, the first embodiment of the welding method for an outer joint member according to the present invention is described with reference to FIGS. 4 and 5. FIGS. 4 and 5 are schematic views illustrating a welding apparatus for carrying out the welding method of this embodiment. FIG. 4 illustrates a state before welding, and FIG. 5 illustrates a state in which the welding is being performed. As illustrated in FIG. 4, a welding apparatus 60 comprises, as main components, welding heads 61, a rotating device 62, a chuck 63, a center hole guide 64, a tailstock 65, workpiece holders 66, a centering tool 67, a case 68, and a vacuum pump 69.

The cup component 12a, the pipe component 13a, and the stub component 13b serving as workpieces are placed on the workpiece holders 66 of the welding apparatus 60. The chuck 63 and the centering tool 67 provided on one end of the welding apparatus 60 are coupled to the rotating device 62, and the cup component 12a is gripped by the chuck 63 in a state in which the cup component 12a is centered by the centering tool 67, thereby applying rotational movement. The center hole guide 64 is integrally mounted to the tailstock 65 provided on another end of the welding apparatus 60, and both the center hole guide 64 and the tailstock 65 are reciprocable in the axial direction (right-and-left direction of FIG. 4). A center hole of the stub component 13b is set to the center hole guide 64 to be centered. The case 68 of the welding apparatus 60 is connected to the vacuum pump 69. In this specification, a sealed space denotes a space 71 formed by the case 68. In this embodiment, the cup component 12a, the pipe component 13a, and the stub component 13b are entirely housed in the sealed space 71. The welding heads 61 are provided at positions corresponding to end portions 72, 73, 74, and 75 of the cup component 12a, the pipe component 13a, and the stub component 13b. The welding heads 61 are allowed to approach the workpieces to reach a predetermined position.

Next, the welding method of this embodiment is described as well as an operation of the welding apparatus 60 constructed as described above. The cup component 12a, the pipe component 13a, and the stub component 13b serving as the workpieces are stocked in a different place from the welding apparatus 60. Each workpiece is extracted by, for example, a robot, and is transported into the case 68 of the welding apparatus 60 exposed to the air illustrated in FIG. 4 to be set to a predetermined position on the workpiece holders 66. At this time, the center hole guide 64 and the tailstock 65 recede to the right side of FIG. 4, and gaps are secured between the end portions 72, 73, 74, and 75 of the cup component 12a, the pipe component 13a, and the stub component 13b. After that, a door (not shown) of the case 68 is closed to activate the vacuum pump 69 and decompress the sealed space 71 formed inside the case 68.

When the sealed space 71 is decompressed to predetermined pressure, as illustrated in FIG. 5, the center hole guide 64 and the tailstock 65 advance to the left side, and the respective gaps of the end portions 72, 73, 74, and 75 of the cup component 12a, the pipe component 13a, the stub component 13b are eliminated. In this manner, the cup component 12a is centered by the centering tool 67 and fixed by the chuck 63, the stub component 13b is supported by the center hole guide 64, and the pipe component 13a sandwiched between the cup component 12a and the stub component 13b is fixed in a state of being centered. After that, the workpiece holders 66 are moved away from the workpieces. Intervals between the workpiece holders 66 and the workpieces at this time may be small, and hence in FIG. 5, the intervals are not shown. As a matter of course, the structure in which the workpiece holders 66 retreat significantly downward may be provided.

After that, although not shown, the welding heads 61 approach the workpieces to reach the predetermined position, and the workpieces are rotated, thereby starting preheating. Unlike a welding condition, as a preheating condition, the welding heads 61 are caused to approach the workpieces to increase a spot diameter, thereby setting a preheating temperature to be lower than a welding temperature. With the preheating, a cooling speed after welding can be lowered to prevent quenching crack. After reaching a predetermined heating time, the welding heads 61 recede to a predetermined position, thereby starting the welding. After completion of the welding, the welding heads 61 retreat, and the rotation of the workpieces is stopped. The intermediate product 11' of the outer joint member 11 in a state of the completion of the welding is illustrated in FIG. 3.

After that, although not shown, the door of the case 68 is opened and the sealed space 71 is exposed to the air. Then, the workpiece holders 66 are moved upward to support the workpieces. In this state, the center hole guide 64 and the tailstock 65 recede to the right side, and the chuck 63 is released. After that, for example, the robot grips the workpieces, and the workpieces are extracted from the welding apparatus 60 to be arrayed in a cooling stocker. After that, the ultrasonic flaw detection is performed on the intermediate product 11' of the outer joint member 11, and then the process proceeds to the lathing step as a subsequent step. In this embodiment, the form in which the cup component 12a, the pipe component 13a, and the stub component 13b are entirely housed in the sealed space 71 is applied, and hence the structure of the sealed space 71 inside the case 68 is simplified.

Specifically, using the cup component 12a having a carbon content of 0.4% to 0.6%, the pipe component 13a having a carbon content of 0.1% to 0.5%, and the stub component 13b having a carbon content of 0.4% to 0.6%, the components were welded in the welding apparatus 60 described above at pressure of the sealed space 71 inside the case 68 set to 6.7 Pa. To prevent rapid cooling after the welding and a hardness of welding portions from increasing, temperatures of the respective end portions of the cup component 12a, the pipe component 13a, and the stub component 13b were equalized through preheating so that the respective end portions of the components were 300° C. to 650° C. After that, the end portions were welded using a fiber laser having an output of 5 kW. As a result, welding portions having a height H of increase in surfaces of the welding portions of less than 0.5 mm were obtained, which did not affect incorporation of the bearing 6 to the shaft section of the intermediate product 11' illustrated in FIG. 3. Further, through the temperature equalization by the preheating, the hardness of the welding portions after completion of the welding was able to be suppressed to a range of Hv 200 to Hv 500. Thus, high welding strength and a stable welding state and stable quality were able to be obtained. In addition, in the sealed structure of the hollow cavity portion 47 not having the ventilation hole, the joining portions 25 and 26 were welded. However, the welding was performed while setting the sealed space 71 of the welding apparatus 60 to atmospheric pressure or lower. Thus, variation in pressure in the hollow cavity portion 47 at the time of the welding was able to be suppressed, and hence the blowing of the molten material and the deformation on the inner diameter side were able to be prevented.

A second embodiment of a welding method for an outer joint member according to the present invention is described with reference to FIGS. 6 and 7. The structure of the welding method according to the second embodiment is different from that of the welding method according to the first embodiment in that only the vicinities of the end portions 72, 73, 74, and 75 of the cup component 12a, the pipe component 13a, and the stub component 13b are housed in the sealed space 71. The parts that have the same function as those of the welding apparatus for carrying out the welding method according to the first embodiment are denoted by the same reference symbols to omit redundant description.

Figure 6:
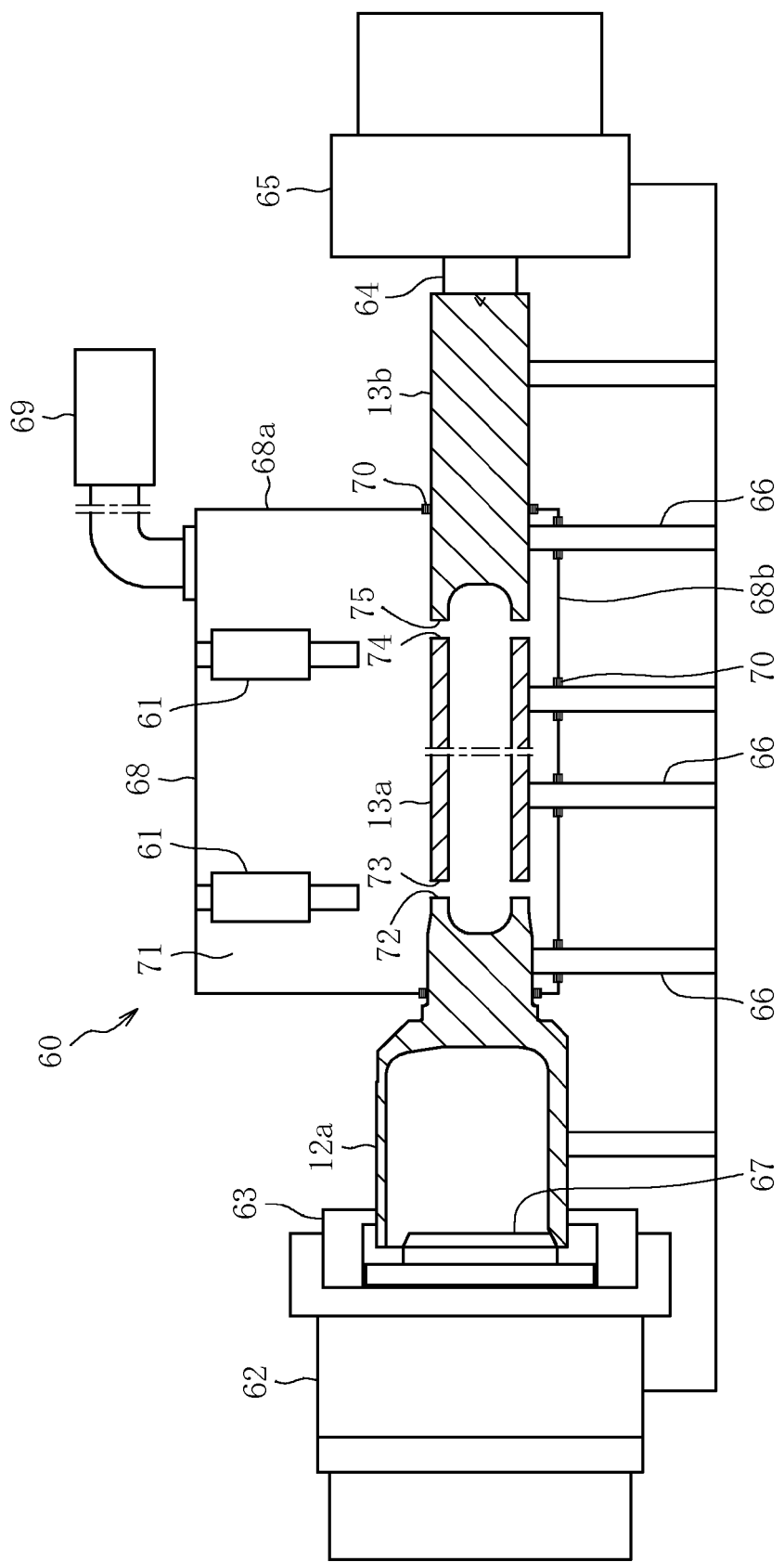
FIG. 6 is a schematic view illustrating a welding apparatus for carrying out a second embodiment of a welding method according to the present invention.
Figure 7:
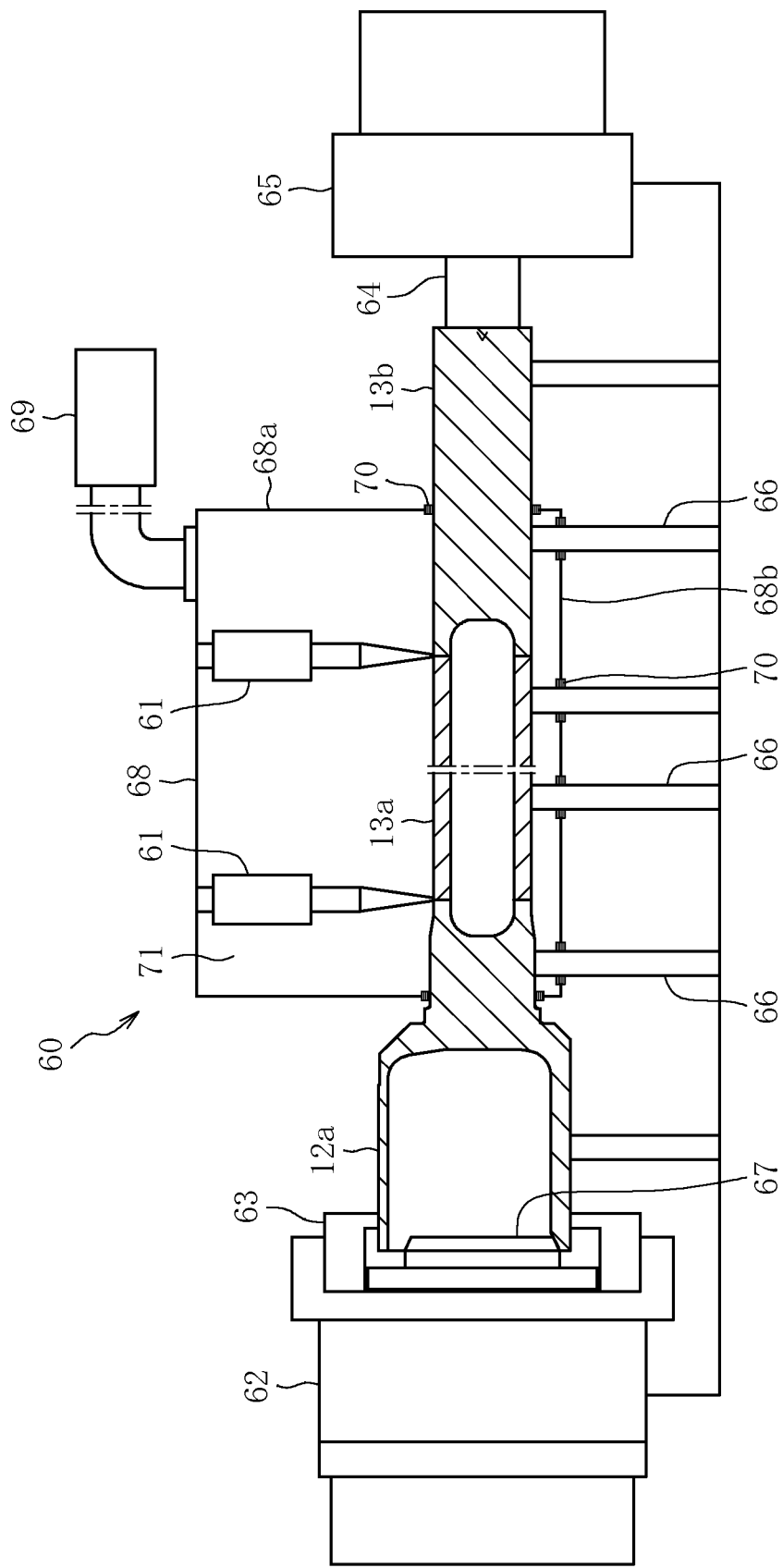
FIG. 7 is a schematic view illustrating the welding apparatus for carrying out the second embodiment of the welding method according to the present invention.

Similarly to the welding apparatus for carrying out the welding method according to the first embodiment, FIG. 6 illustrates a state before welding, and FIG. 7 illustrates a state in which the welding is being performed. In the welding apparatus 60 for carrying out the welding method according to the second embodiment, the cup component 12a, the pipe component 13a, and the stub component 13b are not entirely housed in the sealed space 71 inside the case 68, but only the vicinities of the end portions 72, 73, 74, and 75 of the cup component 12a, the pipe component 13a, and the stub component 13b are housed in the sealed space 71. In an actual design, as in the example of the figure, the case 68 is constructed to cover the components from the middle part of an outer peripheral surface of the cup component 12a to the middle part of an outer peripheral surface of the stub component 13b. Although not shown, the case 68 has the separate structure including an upper case 68a and a lower case 68b, and the upper case 68a is movable upward. The upper case 68a can be moved upward, and the cup component 12a, the pipe component 13a, and the stub component 13b as the workpieces can be carried-in and carried-out from an opening portion of the lower case 68b and the upper case 68a. In the lower case 68b, openings to which the workpiece holders 66 are fitted and depressed portions to which respective outer peripheral surfaces of the cup component 12a and the stub component 13b are fitted are provided, and each fitting part is sealed by a sealing device 70. In the upper case 68a, depressed portions to which the respective outer peripheral surfaces of the cup component 12a and the stub component 13b are fitted are provided, and similarly, the fitting parts are sealed by the sealing device 70. Therefore, after the cup component 12a, the pipe component 13a, and the stub component 13b are set to the workpiece holders 66, the upper case 68a is moved downward to be fitted to the lower case 68b. Thus, the sealed space 71 is formed in the upper and lower cases 68a and 68b.

With the above-mentioned structure, in the welding apparatus 60 for carrying out the welding method of this embodiment, the pump capacity of the vacuum pump 69 can be lowered and the decompressing load can be reduced. The welding method and an operation of the welding apparatus 60 of this embodiment are similar to the welding method and the welding apparatus according to the first embodiment described above, and hence description thereof is omitted.

Next, a second embodiment of an outer joint member according to the present invention is described with reference to FIGS. 8 and 9. In this embodiment, parts that have the same function as those of the first embodiment of the outer joint member are denoted by the same reference symbols to omit redundant description.

Figure 8:
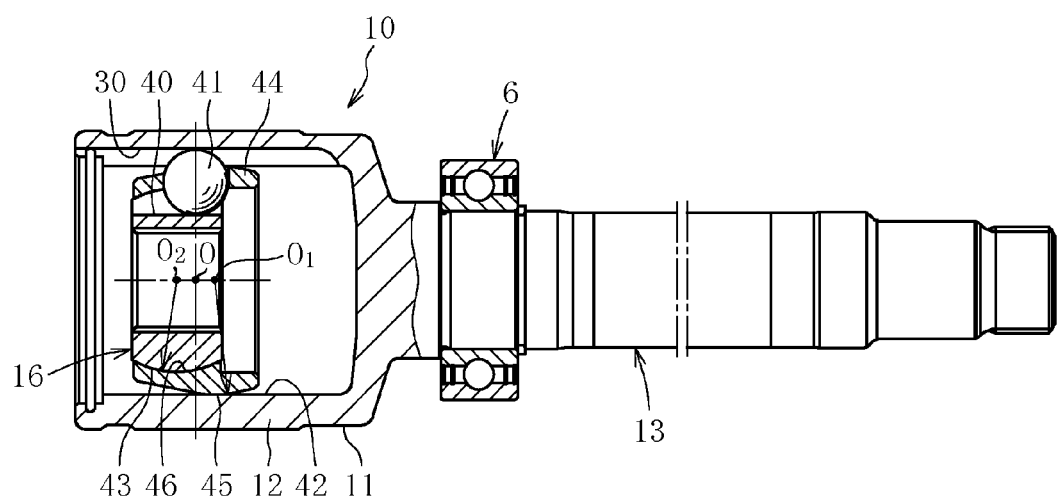
FIG. 8 is a partial vertical sectional view of a constant velocity universal joint using a second embodiment of an outer joint member according to the present invention.

A plunging type constant velocity universal joint 10 illustrated in FIG. 8 is a double offset type constant velocity universal joint (DOJ). The constant velocity universal joint 10 comprises the outer joint member 11 comprising the cup section 12 and the long stem section 13 that extends from the bottom portion of the cup section 12 in the axial direction, the inner joint member 16 housed along the inner periphery of the cup section 12 of the outer joint member 11, balls 41 serving as torque transmitting elements that are arranged between the track grooves 30 and track grooves 40 of the outer joint member 11 and the inner joint member 16, and a cage 44 for holding the balls 41, the cage 44 comprising a spherical outer peripheral surface 45 and a spherical inner peripheral surface 46 that are fitted to a cylindrical inner peripheral surface 42 of the outer joint member 11 and a spherical outer peripheral surface 43 of the inner joint member 16, respectively. A center of curvature O1 of the spherical outer peripheral surface 45 and a center of curvature O2 of the spherical inner peripheral surface 46 of the cage 44 are offset with respect to a joint center O on axially opposite sides.

Similarly to the first embodiment of the outer joint member, the inner race of the support bearing 6 is fixed to the outer peripheral surface of the long stem section 13, and the outer race of the support bearing 6 is fixed to the transmission case with the bracket (not shown). The outer joint member 11 is supported by the support bearing 6 in a freely rotatable manner, and thus the vibration of the outer joint member 11 at the time of driving or the like is prevented as much as possible.

Figure 9:
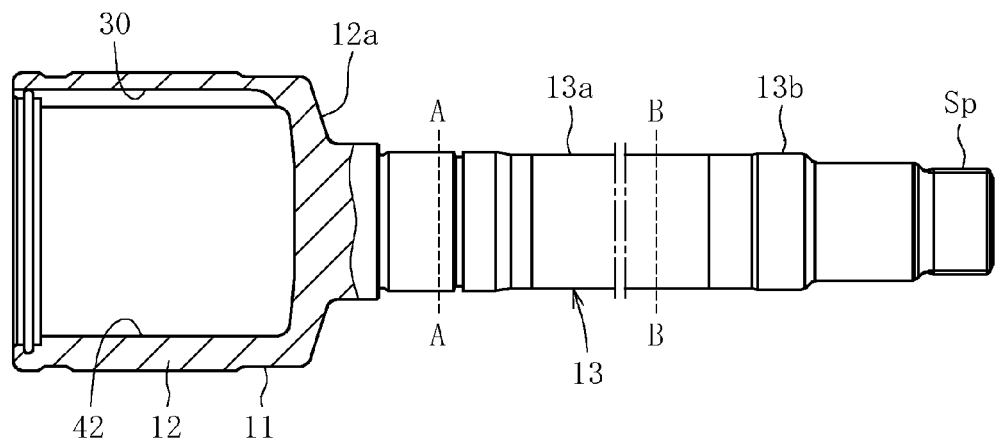
FIG. 9 is a vertical sectional view of the above-mentioned outer joint member.

FIG. 9 is a partial vertical sectional view of the outer joint member 11. As in the example of the figure, the outer joint member 11 comprises the bottomed cylindrical cup section 12 that is opened at one end and has six or eight track grooves 30, on which the balls 41 (see FIG. 8) are arranged, formed in the inner peripheral surface 42 thereof, and the long stem section 13 that extends from the bottom portion of the cup section 12 in the axial direction and comprises the spline Sp serving as the torque transmitting coupling portion formed at the outer surface on the end portion thereof on the opposite side to the cup section 12 (inboard side). Similarly to the first embodiment, the outer joint member 11 is obtained by welding the three components, specifically, the cup component 12a, the pipe component 13a, and the stub component 13b. The cup component 12a and the pipe component 13a are welded at the position indicated by the broken line A, and the pipe component 13a and the stub component 13b are welded at the position indicated by the broken line B. Although not shown, also in this embodiment, the sealed hollow cavity portion not having the ventilation hole is formed. The contents regarding the welding method for an outer joint member according to the first embodiment are similar also in this embodiment, and hence redundant description is omitted.

Figure 10:
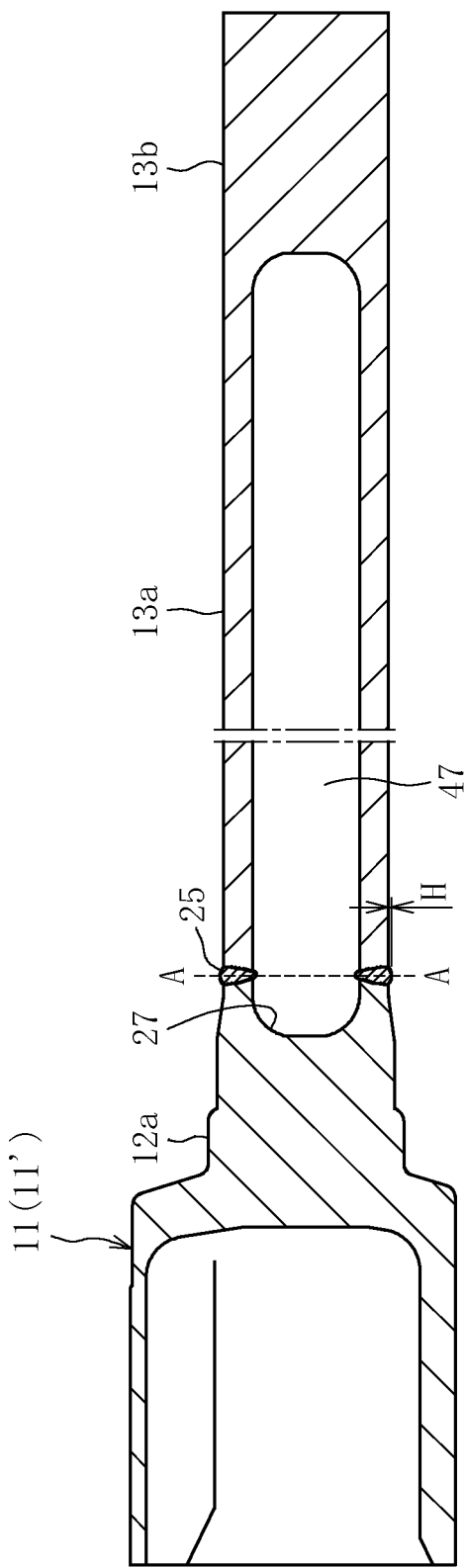
FIG. 10 is a vertical sectional view of a third embodiment of an outer joint member according to the present invention.

A third embodiment of an outer joint member of the present invention is described with reference to FIG. 10. Also in this embodiment, the parts that have the same function as those of the first embodiment of the outer joint member are denoted by the same reference symbols to omit redundant description.

An intermediate product 11' for an outer joint member 11 of this embodiment is different from the intermediate product 11' of the outer joint member 11 according to the first embodiment in that the intermediate product 11' of the outer joint member 11 of this embodiment comprises two components, specifically, the cup component 12a and the stub component 13b integrally comprising a pipe portion 13a. In this embodiment, the stub component 13b is used to construct the shaft member. Also in this embodiment, the structure in which the sealed hollow cavity portion 47 not having the ventilation hole is formed is provided. The stub component 13b is, for example, integrally formed with the pipe portion 13a through a forging process. Only one welding portion 25 is provided, and hence the load of a welding step is reduced. In the case of the outer joint member 11 of this embodiment, the welding heads 61 of the welding apparatus 60 described above are reduced to one welding head 61, and further, the number of the workpiece holders 66 is reduced, which leads to cost reduction of the apparatus. The other structures are similar to those of the outer joint member according to the first embodiment. Further, the contents regarding the welding method according to the first embodiment are similar also in this embodiment, and hence redundant description is omitted.

In the above-mentioned embodiments, among other types of the melt-welding, the configuration that applies the laser welding is described, but the electron beam welding may be also applied similarly. That is, it suffices to provide, as the welding method, a welding method in which the joining portions can be joined without applying pressure in the axial direction and the surfaces of the joining portions are prevented from increasing in thickness unlike the case of the friction press-contact. As a result, in the lathing step for the outer diameter surfaces of the joining portions, which is necessary to mount the support bearing, the number of processes can be reduced or the lathing step itself can be omitted, thereby achieving the reduction of the manufacturing cost. In addition, the surfaces of the joining portions are prevented from increasing in thickness, and hence the total inspection on the joining portions through the ultrasonic flaw detection can be reliably performed, thereby realizing the stable quality.

Further, it suffices that the case 68 of the welding apparatus 60 for carrying out the welding method according to the present invention have a structure in which the sealed space 71 can be formed and the sealed space 71 can be decompressed to be atmospheric pressure or lower. Further, an appropriate form may be applied including the separate structure of the case 68 and the sealing device.

In the embodiments of the outer joint member above, the cases where the present invention is applied to the tripod type constant velocity universal joint as the plunging type constant velocity universal joint 10, and to the double offset type constant velocity universal joint as the plunging type constant velocity universal joint 10 are described. However, the present invention may be applied to a cross-groove type constant velocity universal joint or the like, an outer joint member of another plunging type constant velocity universal joint, and further to an outer joint member of a fixed type constant velocity universal joint. Further, in the above, the present invention is applied to the outer joint member of the constant velocity universal joint, which is used to construct the drive shaft. However, the present invention may be applied to an outer joint member of a constant velocity universal joint, which is used to construct a propeller shaft.

The present invention is not limited to the above-mentioned embodiments. As a matter of course, various modifications can be made thereto without departing from the spirit of the present invention. The scope of the present invention is defined in the claims, and encompasses equivalents described in the claims and all changes within the scope of the claims.

DESCRIPTION OF REFERENCE SIGNS 1 drive shaft
2 intermediate shaft
3 spline
4 boot 5 boot
6 support bearing
10 plunging type constant velocity universal joint
11 outer joint member
12 cup section
12a cup component
13 long shaft section
13a pipe shaft section
13b stub shaft section
16 inner joint member
17 tripod member
19 torque transmitting element (roller)
20 fixed type constant velocity universal joint
21 outer joint member
22 inner joint member
23 torque transmitting element (ball)
24 cage
25 joining portion
26 joining portion
30 track groove
40 track groove
41 torque transmitting element (ball)
47 hollow cavity portion
60 welding apparatus
71 sealed space
72 end portion
73 end portion
74 end portion
75 end portion
A joining surface
B joining surface
O joint center
O1 center of curvature
O2 center of curvature

The invention claimed is:

1. A welding method for an outer joint member of a constant velocity universal joint, the outer joint member comprising a cup section having track grooves, which engage with torque transmitting elements, formed along an inner periphery thereof and a shaft section formed on a bottom portion of the cup section, the welding method comprising:
preparing a cup member forming the cup section and a shaft member forming the shaft section,
wherein the cup member and the shaft member are shaped so that a sealed hollow cavity portion is formed when an end portion at a side of the bottom portion of the cup member and an end portion of the shaft member are brought into abutment against each other,
positioning the cup member and the shaft member so that a gap communicating with the sealed hollow cavity portion is secured between the end portion at the side of the bottom portion of the cup member and the end portion of the shaft member,
decompressing the sealed hollow cavity portion to atmospheric pressure or lower through the gap;
bringing the end portion at the side of the bottom portion of the cup member and the end portion of the shaft member into abutment against each other; and
melt-welding the end portion at the side of the bottom portion of the cup member and the end portion of the shaft member to each other in a state in which the sealed hollow cavity portion is under the atmospheric pressure or lower.

2. The welding method for an outer joint member of a constant velocity universal joint according to claim 1, wherein the state in which the sealed hollow cavity portion is under the atmospheric pressure or lower is obtained by entirely housing the cup member and the shaft member in a sealed space, and decompressing the sealed space to the atmospheric pressure or lower.

3. The welding method for an outer joint member of a constant velocity universal joint according to claim 1, wherein the state in which the sealed hollow cavity portion is under the atmospheric pressure or lower is obtained by housing only a vicinity of the end portion at the side of the bottom portion of the cup member and the end portion of the shaft member in a sealed space, and decompressing the sealed space to the atmospheric pressure or lower.

4. The welding method for an outer joint member of a constant velocity universal joint according to claim 1, wherein the melt-welding comprises laser welding.

5. The welding method for an outer joint member of a constant velocity universal joint according to claim 1, wherein the melt-welding comprises electron beam welding.

6. The welding method for an outer joint member of a constant velocity universal joint according to claim 4, further comprising preheating the end portion at the side of the bottom portion of the cup member and the end portion of the shaft member to 300° C. to 650° C. before the melt-welding.

7. The welding method for an outer joint member of a constant velocity universal joint according to claim 1, wherein a hardness of the end portion at the side of the bottom portion of the cup member and the end portion of the shaft member at which the melt-welding is performed is Hv 200 to Hv 500.

8. The welding method for an outer joint member of a constant velocity universal joint according to claim 5, further comprising preheating the end portion at the side of the bottom portion of the cup member and the end portion of the shaft member to 300° C. to 650° C. before the melt-welding.

9. The welding method for an outer joint member of a constant velocity universal joint according to claim 2, wherein a hardness of the end portion at the side of the bottom portion of the cup member and the end portion of the shaft member at which the melt-welding is performed is Hv 200 to Hv 500.

10. A welding method for an outer joint member of a constant velocity universal joint, the outer joint member comprising a cup section having track grooves, which engage with torque transmitting elements, formed along an inner periphery thereof and a shaft section formed on a bottom portion of the cup section, the welding method comprising:
preparing a cup member forming the cup section and a shaft member forming the shaft section, the shaft member being constructed of two or more separate members, the cup member and the shaft member being shaped so that a sealed hollow cavity portion is formed when an end portion at a side of the bottom portion of the cup member and a first end portion of a first of the two or more separate members are brought into abutment against each other and a second end portion of the first of the two or more separate members and an end portion of a second of the two or more separate members are brought into abutment against each other,
positioning the cup member and the two or more separate members so that gaps communicating with the sealed hollow cavity portion are secured between the end portion at the side of the bottom portion of the cup member and the first end portion of the first of the two or more separate members and between the second end portion of the first of the two or more separate members and the end portion of the second of the two or more separate members, decompressing the sealed hollow cavity portion to atmospheric pressure or lower through the gaps;

bringing the end portion at the side of the bottom portion of the cup member and the first end portion of the first of the two or more separate members into abutment against each other and bringing the second end portion of the first of the two or more separate members and the end portion of the second of the two or more separate members into abutment against each other; and melt-welding the end portion at the side of the bottom portion of the cup member and the first end portion of the first of the two or more separate members to each other and melt-welding the second end portion of the first of the two or more separate members and the end portion of the second of the two or more separate members to each other in a state in which the sealed hollow cavity portion is under the atmospheric pressure or lower.

11. The welding method for an outer joint member of a constant velocity universal joint according to claim 10, wherein the state in which the sealed hollow cavity portion is under the atmospheric pressure or lower is obtained by entirely housing the cup member and the two or more separate members in a sealed space, and decompressing the sealed space to the atmospheric pressure or lower.

12. The welding method for an outer joint member of a constant velocity universal joint according to claim 10, wherein the state in which the sealed hollow cavity portion is under the atmospheric pressure or lower is obtained by housing only a vicinity of the end portion at the side of the bottom portion of the cup member, the first end portion of the first of the two or more separate members, the second end portion of the first of the two or more separate members, and the end portion of the second of the two or more separate members, in a sealed space, and decompressing the sealed space to the atmospheric pressure or lower.

13. The welding method for an outer joint member of a constant velocity universal joint according to claim 10, wherein the melt-welding comprises laser welding.

14. The welding method for an outer joint member of a constant velocity universal joint according to claim 10, wherein the melt-welding comprises electron beam welding.

15. The welding method for an outer joint member of a constant velocity universal joint according to claim 13, further comprising preheating the end portion at the side of the bottom portion of the cup member, the first end portion of the first of the two or more separate members, the second end portion of the first of the two or more separate members, and the end portion of the second of the two or more separate members to 300° C. to 650° C. before the melt-welding.

16. The welding method for an outer joint member of a constant velocity universal joint according to claim 14, further comprising preheating the end portion at the side of the bottom portion of the cup member, the first end portion of the first of the two or more separate members, the second end portion of the first of the two or more separate members, and the end portion of the second of the two or more separate members to 300° C. to 650° C. before the melt-welding.

17. The welding method for an outer joint member of a constant velocity universal joint according to claim 10, wherein a hardness of the end portion at the side of the bottom portion of the cup member, the first end portion of the first of the two or more separate members, the second end portion of the first of the two or more separate members, and the end portion of the second of the two or more separate members at which the melt-welding is performed is Hv 200 to Hv 500.

* * * * *